(12) United States Patent
Takabe et al.

(10) Patent No.: US 7,171,934 B2
(45) Date of Patent: Feb. 6, 2007

(54) INTAKE MANIFOLD

(75) Inventors: Yoshinori Takabe, Aichi (JP); Atsuhito Ito, Aichi (JP)

(73) Assignees: Mitsubishi Jidosha Kogyo Kabushiki Kaisha, Tokyo (JP); Mitsubishi Jidosha Engineering Kabushiki Kaisha, Okazaki (JP)

( * ) Notice: Subject to any disclaimer, the term of this patent is extended or adjusted under 35 U.S.C. 154(b) by 0 days.

(21) Appl. No.: 10/967,184

(22) Filed: Oct. 19, 2004

(65) Prior Publication Data

US 2005/0115535 A1    Jun. 2, 2005

(30) Foreign Application Priority Data

Oct. 20, 2003   (JP)   .......................... P2003-3599914

(51) Int. Cl.
*F02M 35/104*   (2006.01)

(52) U.S. Cl. ............................................. 123/184.53

(58) Field of Classification Search ........... 123/184.42, 123/184.43, 184.47, 184.61, 184.53
See application file for complete search history.

(56) References Cited

FOREIGN PATENT DOCUMENTS

JP            04050430 A   *   2/1992
JP            10-213025 A       8/1998

* cited by examiner

*Primary Examiner*—Stephen K. Cronin
*Assistant Examiner*—Hyder Ali
(74) *Attorney, Agent, or Firm*—Birch, Stewart, Kolasch & Birch, LLP

(57) ABSTRACT

In a branch pipe of an intake manifold, portion c in the central part is kept at relatively small constant inner diameter for an interval C, and portion e of which an end is connected to the surge tank is kept at relatively large constant inner diameter for an interval E, whereby the volumetric efficiency at the time of medium speed and high speed of engine is excellent.

3 Claims, 5 Drawing Sheets

INTAKE MANIFOLD

CROSS-REFERENCE TO RELATED APPLICATION

This application incorporates by references the subject matter of Application NO. 2003-359914 filed in Japan on 20 Oct. 2003, on which a priority claim is based under 35 U.S.C §119(a).

BACKGROUND OF THE INVENTION

1. Field of the Invention

The present invention relates to an intake manifold for an engine, and more particularly to a structure of a branch pipe thereof.

2. Description of the Related Art

Conventionally, in an intake manifold for an engine, each branch pipe 3 connected to an intake port 2 of a cylinder head 1 has an opening 4 on the intake port 2 which has an inner diameter almost equal to that of the intake port 2. The inner diameter of the branch pipe 3 gradually increases toward the other opening 6 connected to a surge tank 5, as illustrated in FIG. 5. The intake air amount of cylinder in the engine or volumetric efficiency is affected by the length and inner diameter of the branch pipe 3.

That is, as the inner diameter of the branch pipe 3 in the intake manifold increases and the length of the branch pipe 3 decreases, the volumetric efficiency at the time of high speed of engine is increased to produce a higher output.

And as the inner diameter of the branch pipe 3 in the intake manifold decreases and the length of the branch pipe 3 increases, the volumetric efficiency at the time of medium speed or low speed of engine is increased to produce a higher output.

Accordingly, to increase the volumetric efficiency at the time of medium speed and low speed of engine, there is conventionally a case in which a mechanism for varying the length of the branch pipe according to the rotating speed of the engine is provided. But when the length of the branch pipe 3 is fixed as illustrated in FIG. 5, it is required to change the inner diameter of the branch pipe 3 according to the distance L from the opening 4 on the intake port in the branch pipe 3. Ideally, to obtain the excellent volumetric efficiency according to the engine characteristics, it is necessary to change the inner diameter of the branch pipe 3 according to the distance L from the opening 4 as shown in FIG. 6 in which the medium speed and high speed specifications are illustrated.

However, if the inner diameter of the branch pipe 3 in the engine is set in either the medium speed or high speed specifications for the engine, the volumetric efficiency at the time of high speed is greatly decreased for the branch pipe 3 in the medium speed specifications, or the volumetric efficiency at the time of medium speed is remarkably decreased for the branch pipe 3 in the high speed specifications, as represented by a curve x in the medium speed specifications or a curve y in the high speed specifications in FIG. 7.

In JP-A-10-213025, an intake manifold was disclosed in which a branch pipe has a constant inner diameter, and has a greater diameter near a connection portion with a surge tank. With this constitution, the intake air flow efficiency from the surge tank into the branch pipe is increased. However, with a technique as described in this publication, since the inner diameter of the branch pipe is constant from the intake port connection portion to the vicinity of the surge tank, the inner diameter of the branch pipe is almost equal to the diameter of the intake port. Accordingly, it is possible that the branch pipe of this shape has a greater branch pipe sectional area than the branch pipe having the same length, as illustrated in FIG. 5. Thereby it has the increased volumetric efficiency at the time of medium speed and the increased intake air flow efficiency. But there is a problem that the volumetric efficiency at the time of high speed is not improved.

SUMMARY OF THE INVENTION

It is an object of the invention to provide a branch pipe of an intake manifold that has a relatively excellent volumetric efficiency at the time of medium speed and high speed of engine.

An intake manifold according to the invention comprises a branch pipe for connecting a cylinder head of an engine and a surge tank, wherein the branch pipe includes a first portion a passage sectional area of which is gradually increased from the cylinder head toward the surge tank, a second portion extending from the first portion and having a constant passage sectional area which is larger than that of the first portion, a third portion extending from the second portion and a passage sectional area of which is gradually increased, and a fourth portion extending from the third portion and having a constant passage sectional area which is larger than that of the third portion, an end portion of the fourth portion being connected to the surge tank.

That is, the passage sectional area of the fourth portion of the branch pipe on the side of the surge tank, apart from the cylinder head of the engine, is kept at a relatively large constant value between the cylinder head and the surge tank, whereby the volumetric efficiency at the time of high speed of engine is easily increased. And the passage sectional area of the second portion of the branch pipe near the cylinder head of the engine is kept at a relatively small constant value between the cylinder head and the surge tank, whereby the volumetric efficiency at the time of medium speed of engine is prevented from being deteriorated, so that the volumetric efficiency at the time of medium speed and high speed of the engine is kept at relatively high value as a whole.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF PREFERRED EMBODIMENTS

Figure 1:
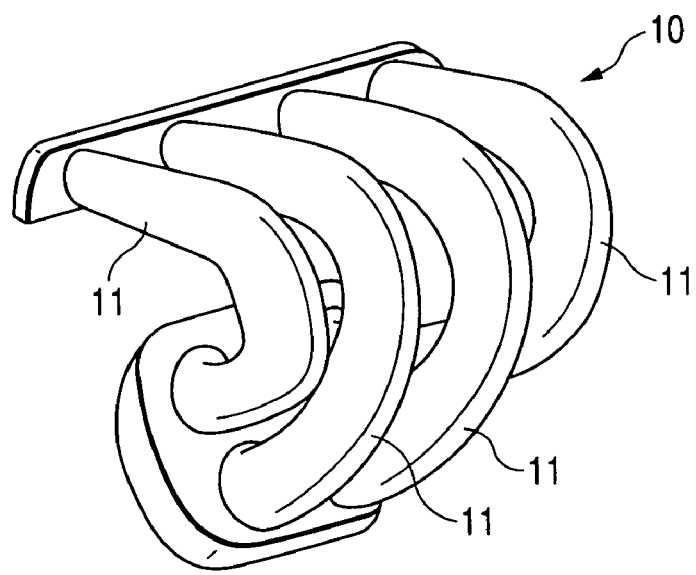
FIG. 1 is a schematic perspective view of an intake manifold according to an embodiment of the invention.

In the following embodiments, like reference characters designate the same or similar parts throughout the figures.

Figure 2:
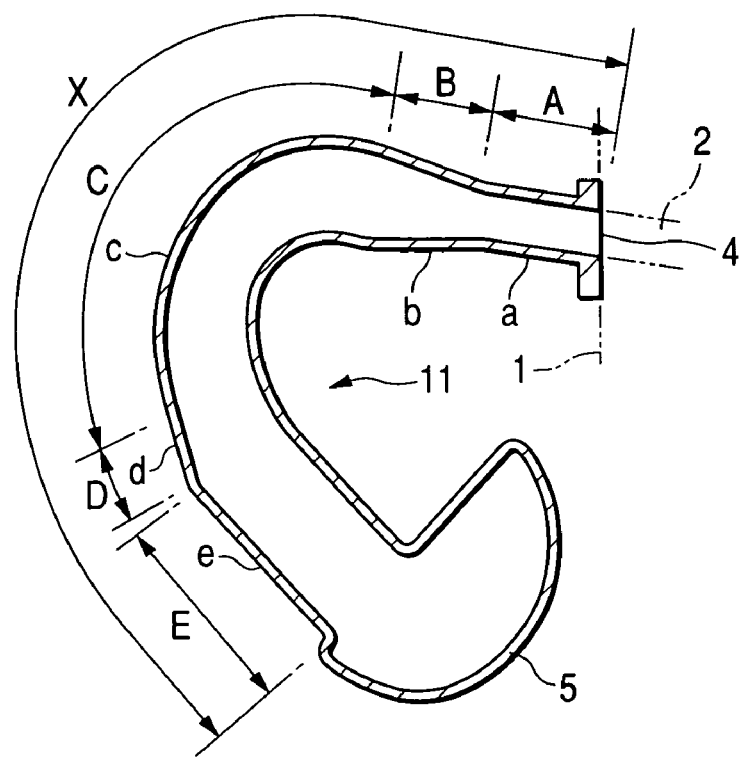
FIG. 2 is a cross-sectional enlarged view of an essential part of the intake manifold along the axial line.
Figure 3:
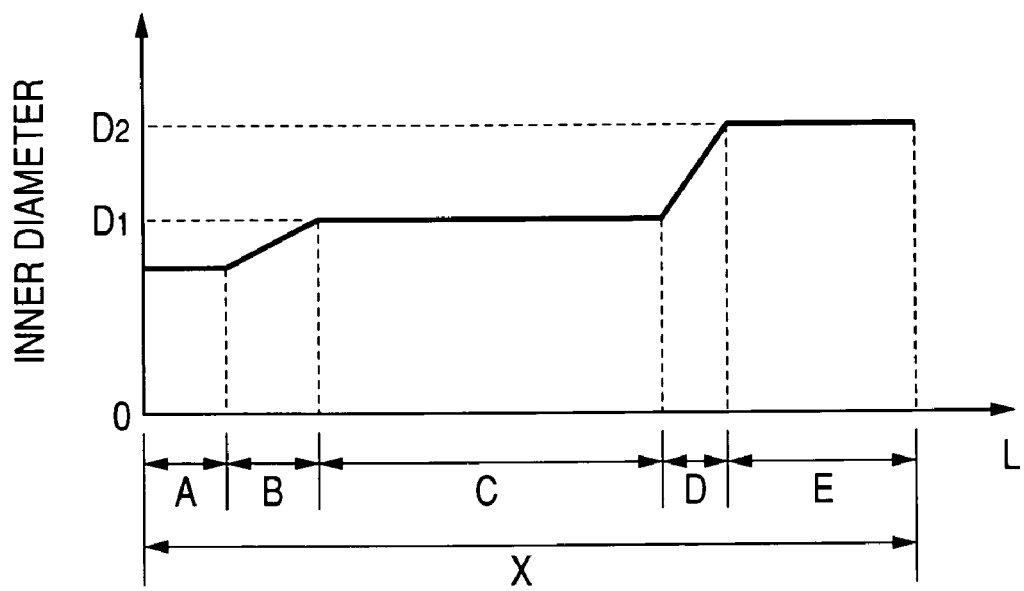
FIG. 3 is a conceptual inner diameter variation chart of the essential part.

In FIGS. 1 to 3, an intake manifold 10 of a 4-cylinder engine has four branch pipes 11 corresponding to each cylinder, in which each branch pipe 11 connects an intake port 2 of a cylinder head 1 and a surge tank 5.

The branch pipe 11 has an opening 4 on the intake port 2 with an inner diameter almost equal to that of the intake port 2. Successively from the cylinder head 1 to the surge tank 5, the branch pipe 11 includes: portion "a" of the interval length A in which the inner diameter is kept equal to the inner diameter of the intake port 2, or the interval length A in which the inner diameter is slightly larger than the inner diameter of the intake port 2; portion "b" of the interval length B extending from portion "a", in which the inner diameter is gradually increased; portion "c" of the interval length C extending from portion "b", in which the inner diameter (diameter) is kept at a fixed value D1 that is larger than that of portion "a"; portion d of the interval length D extending from portion "c", in which the inner diameter is gradually increased; and portion "e" of the interval length E extending from the portion d, in which the inner diameter (diameter) is kept at a fixed value D2 that is larger than that of portion "c" and an end portion of portion "e" is directly connected to the surge tank 5.

In the above explanation, the inner diameter of the branch pipe 11 is replaced with that of a perfect circle, which has the same cross-sectional area as a passage within the branch pipe 11. The cross-section of the branch pipe 11 may actually be a perfect circle.

A method for setting the inner diameters D1 and D2 of portion "c" and portion "e" of the branch pipe and the interval lengths C and E will be described.

First of all, a length X' (X'=A'+B'+C'+D'+E') of the branch pipe, at which the required characteristic (volumetric efficiency) of the engine is obtained especially at the time of high speed, is temporarily fixed.

Herein, X' is an initial value of the length X of branch pipe before tuning, A' is an initial value of interval length A before tuning, B' is an initial value of interval length B before tuning, C' is an initial value of interval length C before tuning, D' is an initial value of interval length D before tuning, and E' is an initial value of interval length E before tuning.

Further, the diameters D1' and D2' of the intervals with the constant inner diameter, in which the required characteristic (volumetric efficiency) of the engine is obtained, is temporarily fixed.

Herein, D1' is an initial value of the inner diameter of portion "c" of the interval length C, and D2' is an initial value of the inner diameter of portion "e" of the interval length E.

Herein, D1' at which the required characteristic (volumetric efficiency) of the engine at the time of high speed is obtained is temporarily fixed, and D2' at which the required characteristic (volumetric efficiency) of the engine at the time of medium speed is obtained is temporarily fixed.

In setting these temporarily fixed initial values, it should be noted that the length and diameter of the branch pipe are temporarily fixed in the light of mounting the engine on the vehicle.

Since X' and D2' have influence on the volumetric efficiency at the time of high speed, when the engine required characteristic is the maximum output or maximum torque at the time of high speed, X' is equalized to X and D2' is equalized to D2 to assure the volumetric efficiency at which the maximum output or maximum torque at the time of high speed is obtained, and then the tuning is performed to increase the volumetric efficiency at the time of medium speed.

That is, since X and D2 are already set in this case, the proportion of A, B, C, D and E and D1 are specifically set.

An actual machine test or simulation test is performed for the suction branch pipe in which the length X and area D2 of the branch pipe are fixed in this way, and the length and diameter D1 of each portion of the branch pipe are fixed, based on its test results.

For example, when the volumetric efficiency at the time of medium speed is too low to satisfy the engine requirement performance, the interval length C' maybe increased and changed to C", or the inner diameter of portion "c" may be changed to be small (D1").

In this case, if the interval length of portion "cc" is simply increased, the length X' of branch pipe becomes longer. This brings about a problem that the mountablity to the vehicle is deteriorated, and the volumetric efficiency at the time of high speed is lowered. Thus, it is required that the length of portion "a" or the length of portion "e" is shortened. When the length of portion "b" or portion "d" is shortened, for example, the diameters D1 and D2 are abruptly changed. This brings about a problem that the volumetric efficiency is abruptly changed. Thus, it is unfavorable that the lengths of portion "b" and portion "d" are extremely changed.

Herein, if portion "a" is shortened, the volumetric efficiency at the time of low speed is decreased. Thus, it is required that the inner diameter of portion "a" is reduced when portion "a" is shortened. However, if portion "a" is made extremely narrow, the suction resistance at the time of high speed is increased. Accordingly, when the length of portion "c" is made longer (C"), it is preferred that the length of portion "e" is made shorter (E").

Also, when the inner diameter of interval C is made small (D1") to increase the volumetric efficiency at the time of medium speed, the total volume of the branch pipe is decreased, whereby there is possibility that the volumetric efficiency at the time of high speed is decreased. At this time, since D2 is fixed, the length E of portion "e" is changed so that the volumetric efficiency at the time of high speed is not decreased but the volumetric efficiency at the time of medium speed is increased. When fixed D2 is changeable to some extent, diameter D2 may be enlarged within a permissible range.

When it is required that the engine required characteristic (volumetric efficiency) at the time of low speed is also enhanced, the lengths A and B of portions "a" and "b" may be adjusted in addition.

To attain the high engine required characteristic (volumetric efficiency) at the time of medium speed, the length C and the inner diameter D1 of portion "c" are changed in the above way and the shapes (A, B, C, D, E, D1 and D2) of the branch pipe are finally decided to satisfy the required performance at each speed of engine.

As a result of the research made by the present inventors, it has been found that at the following ratio the volumetric efficiency at the time of medium speed is increased, while the volumetric efficiency at the time of high speed is secured. And it has been also found that the length of each portion and the inner diameter of portion with constant sectional area have the tendency for the predetermined engine speed of rotation (Ne), as shown in FIGS. 8A to 8F.

Figure 8A:
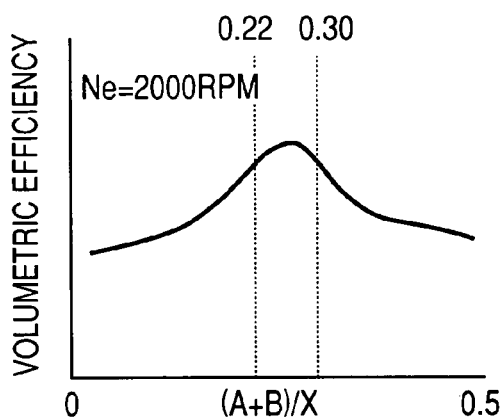
FIGS. 8A to 8F are explanatory views for explaining the action of a variation in the volumetric efficiency to the length of each portion/total length of the branch pipe at a predetermined rotating speed of the engine, and a variation in the volumetric efficiency to the inner diameter of the constant inner diameter of branch pipe/the length of the constant inner diameter of branch pipe.
Figure 8B:
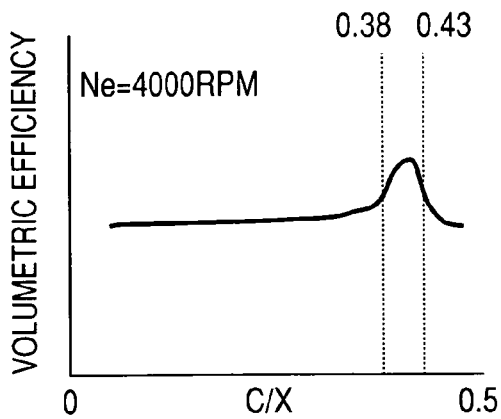
Figure 8C:
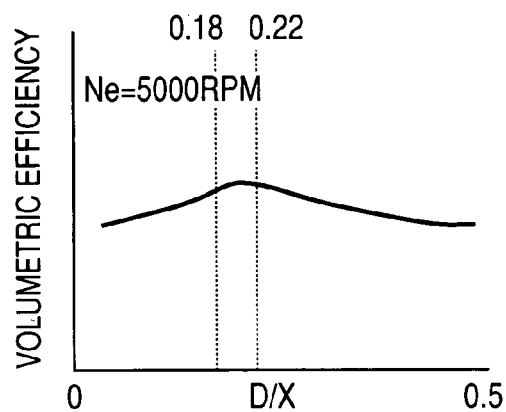
Figure 8D:
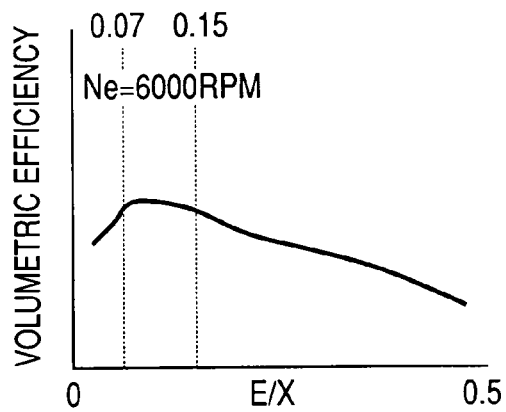
Figure 8E:
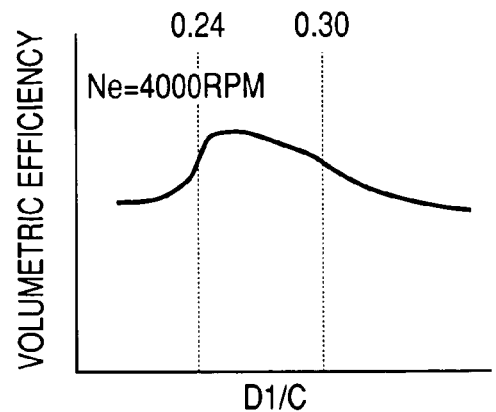
Figure 8F:
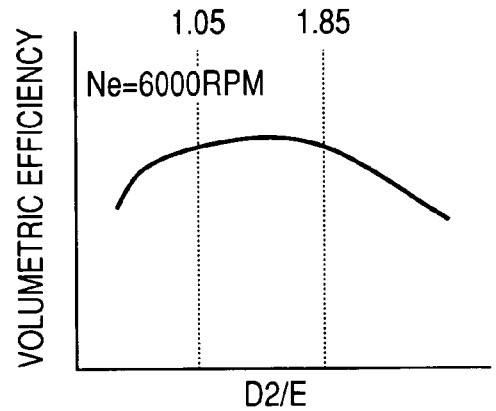

As seen from the results of tuning as shown in FIGS. 8A to 8F, to satisfy the required characteristic of engine for the predetermined engine speed of rotation (Ne), assuming that the total length from the opening 4 of the branch pipe 3 to the surge tank 5 is X, it is preferable to set (A+B)/X at 0.22 to 0.30, preferably around 0.286, as shown in FIG. 8A. Also it is preferable to set C/X at 0.38 to 0.43, preferably around 0.429, as shown in FIG. 8B. Also it is preferable to set D/X at 0.18 to 0.22, preferably around 0.214, as shown in FIG. 8C. Also it is preferable to set E/X at 0.07 to 0.15, preferably around 0.071, as shown in FIG. 8D. Also it is preferable to set D1/C at 0.24 to 0.30, preferably around 0.244, as shown in FIG. 8E. And it is preferable to set D2/E at 1.05 to 1.85, preferably around 1.80, as shown in FIG. 8F.

Figure 4:
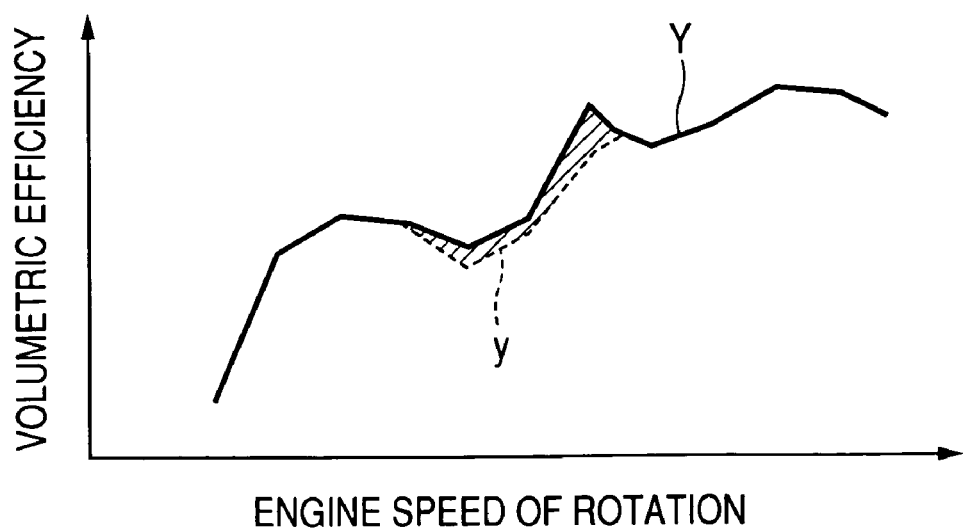
FIG. 4 is a chart for explaining the action of the intake manifold according to the embodiment.
Figure 5:
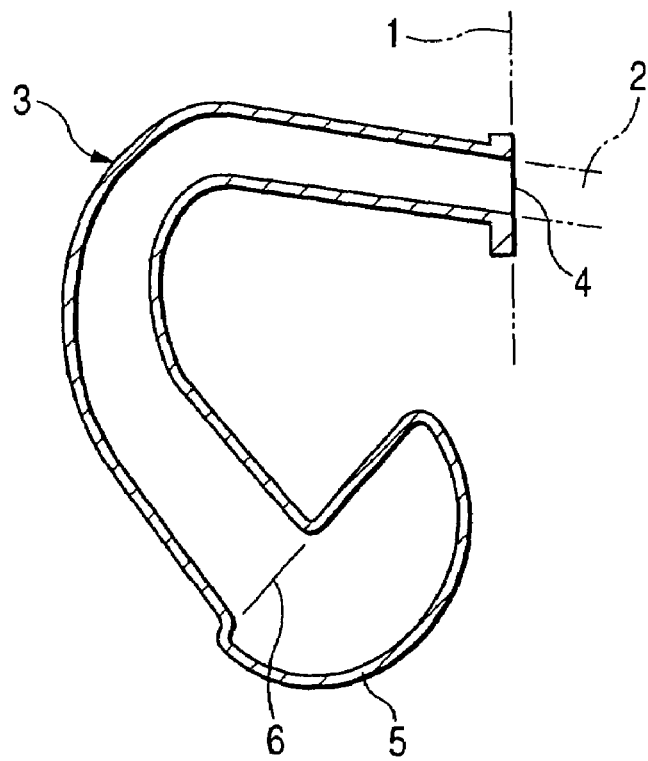
FIG. 5 is a cross-sectional view of an essential part of the conventional device along the axial line.
Figure 6:
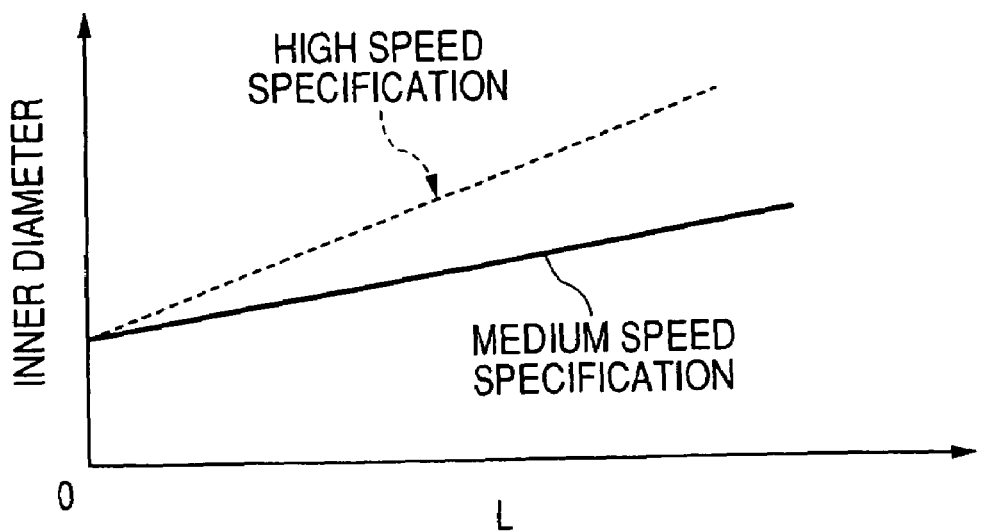
FIG. 6 is a chart for explaining the structure of an intake pipe.
Figure 7:
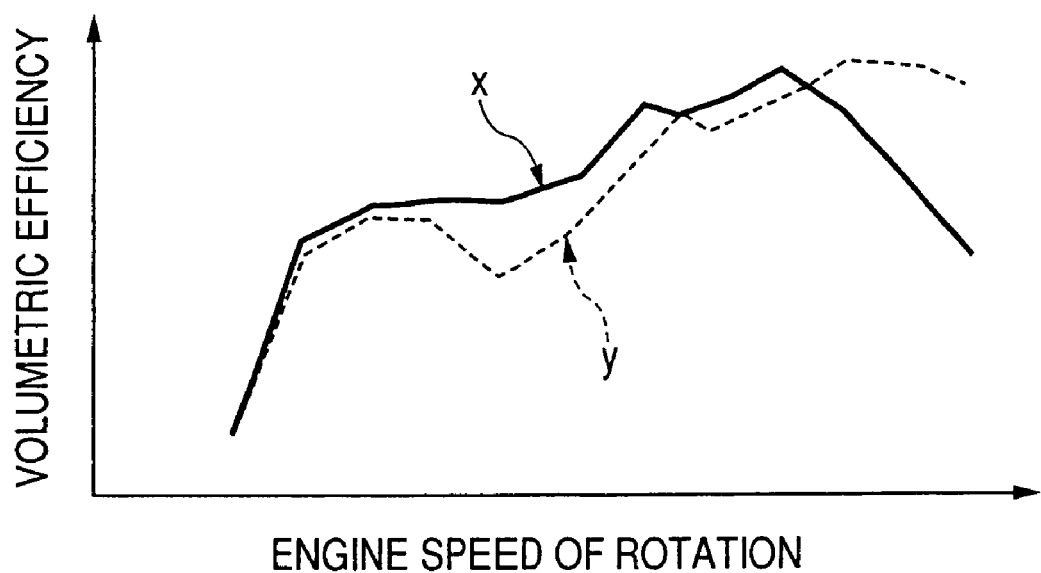
FIG. 7 is a chart for explaining the action of the conventional device.

In the intake manifold 10, since portion "e" of the branch pipe 11 on the side of the surge tank 5 apart from the cylinder head 1 is set to have an inner diameter of relatively large constant value D2, and the length E is appropriately selected, the volumetric efficiency at the time of high speed of engine is easily increased, as represented by a curve Y in FIG. 4.

And since portion "c" in the central part of the branch pipe 11 is set to have an inner diameter of relatively smaller constant value D1 than the inner diameter of portion "ee", and the length C is appropriately selected, the collapse of the volumetric efficiency at the time of medium speed of engine is securely prevented owing to its influence as represented by the curve Y, corresponding to the hatched portion, as compared with the curve y for the volumetric efficiency of the conventional branch pipe 3 in the high speed specifications. Accordingly, the intake manifold 10 with the branch pipe 11 can keep the overall volumetric efficiency relatively high over the time of medium speed and high speed of engine, and consequently increase the engine output.

Also, with the above constitution, since portions "a" and "b" are set to the optimal lengths, the volumetric efficiency is enhanced not only at the time of medium speed and high speed of engine but also at the time of low speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake manifold comprising:

a branch pipe for connecting a cylinder head of an engine and a surge tank, wherein the branch pipe includes a first portion a passage sectional area of which is gradually increased from the cylinder head toward the surge tank, a second portion extending from the first portion and having a constant passage sectional area which is larger than that of the first portion, a third portion extending from the second portion and a passage sectional area of which is gradually increased, and a fourth portion extending from the third portion and having a constant passage sectional area which is larger than that of the third portion, an end portion of the fourth portion being connected to the surge tank, wherein the following relations are established:

$(A+B)/X=0.22$ to $0.30$, $C/X=0.38$ to $0.43$, $D/X=0.18$ to $0.22$, $E/X=0.07$ to $0.15$, $D1/C=0.24$ to $0.30$, and $D2/E=1.05$ to $1.85$;

where X represents a total length from an opening of the branch pipe (11) on the side of the cylinder head (1) to the surge tank (5), A+B represents a length of the first portion, C represents a length of the second portion, D represents a length of the third portion, E represents a length of the fourth portion, D1 represents an inner diameter of a perfect circle that has a same cross sectional area as the passage sectional area of the second portion, and D2 represents an inner diameter of a perfect circle that has a same cross sectional area as the passage sectional area of the fourth portion.

2. The intake manifold according to claim 1, wherein a section of the branch pipe is a perfect circle.

3. The intake manifold according to claim 1, wherein (A+B)/X is substantially equal to 0.286, C/X is substantially equal to 0.429, D/X is substantially equal to 0.214, E/X is substantially equal to 0.071, D1/C is substantially equal to 0.244, and D2/E is substantially equal to 1.80.

* * * * *